United States Patent [19]

Myer

[11] 4,392,624
[45] Jul. 12, 1983

[54] IMPLANTED BOUNDARY LAYER TRIP

[75] Inventor: Robert J. Myer, Rancho Palos Verdes, Calif.

[73] Assignee: The United States of America as represented by the Secretary of the Air Force, Washington, D.C.

[21] Appl. No.: 232,094

[22] Filed: Feb. 6, 1981

[51] Int. Cl.³ .............................................. B64G 1/58
[52] U.S. Cl. .............................. 244/158 A; 244/121; 428/408
[58] Field of Search ............... 244/158 A, 121, 117 A, 244/3.1; 428/408, 218

[56] References Cited

U.S. PATENT DOCUMENTS

| 3,001,473 | 9/1961 | Shepheard | 244/158 A |
|---|---|---|---|
| 3,010,398 | 11/1961 | Parlanti | 102/92.5 |
| 3,026,806 | 3/1962 | Runton et al. | 244/158 A |
| 3,028,128 | 4/1962 | Friedrich | 244/117 |
| 3,177,811 | 4/1965 | Baylor et al. | 102/92.5 |
| 3,210,233 | 10/1965 | Kummer et al. | 244/117 A |
| 3,724,386 | 4/1973 | Schmidt | 244/158 A |
| 3,745,928 | 7/1973 | Kinnaird et al. | 244/158 A |
| 3,883,096 | 5/1975 | Osofsky | 244/117 |
| 4,131,708 | 12/1978 | Moores et al. | 428/257 |
| 4,193,828 | 3/1980 | Moores et al. | 244/158 A |
| 4,201,611 | 5/1980 | Stover | 244/158 A |

Primary Examiner—Charles E. Frankfort
Attorney, Agent, or Firm—Donald J. Singer; William J. O'Brien

[57] ABSTRACT

A technique for monitoring the ablation symmetry of a reentry vehicle by implanting a boundary layer trip material into the nose-tip surfaces of the re-entry vehicle's nose cone. The implantation material is characterized by a density that is usually greater and surface roughness that is greater than that which characterizes the material forming the main portion of the nose cone.

6 Claims, 5 Drawing Figures

FIG. 1
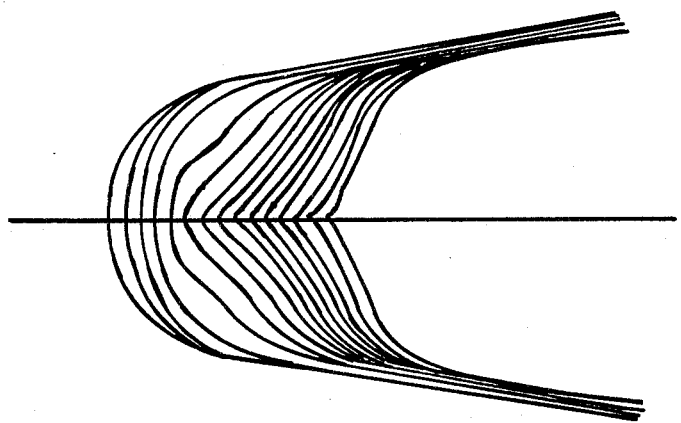
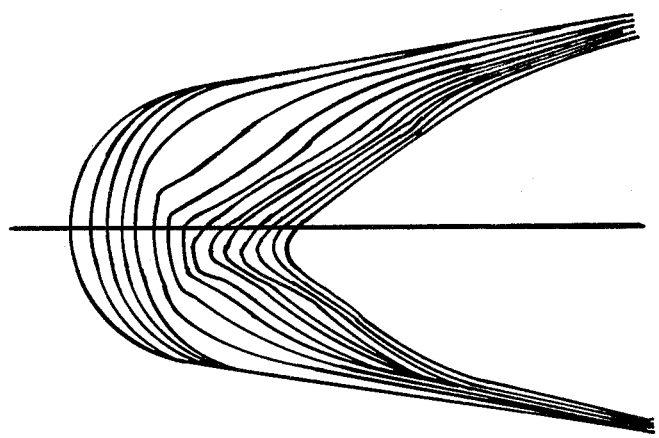
FIG. 2
FORWARD ← → REARWARD
 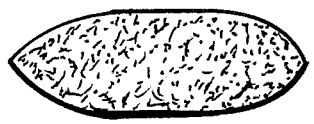 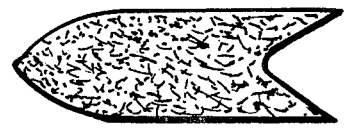
(A) FLAT   (B) BOAT-TAILED   (C) RECESSED
FIG. 5

IMPLANTED BOUNDARY LAYER TRIP

STATEMENT OF GOVERNMENT INTEREST

The invention described herein may be manufactured and used by or for the Government for governmental purposes without the payment of any royalty thereon.

BACKGROUND OF THE INVENTION

This invention relates to a method for providing thermal protection for re-entry vehicles. More particularly, this invention concerns itself with the implantation into the nose-tip of a re-entry vehicle of a carbon-carbon implant material having a different density, usually but not necessarily greater and greater roughness than the material of the main portion of the re-entry vehicles nose cone.

At the present time, a considerable research effort is being undertaken in an attempt to provide significant technical advances and improvements in re-entry vehicle technology. Of particular concern is the provision of improved nosetip material concepts in terms of higher performance and lower recession. Among the more important structural materials recently suggested are those of a carbonaceous content and of woven construction. This type of material is generally referred to as a carbon-carbon fibrous composite since, in its fully processed state, both the woven fibers and their binding resinous matrix are generally carbon or graphite. Such materials are well known for their use in re-entry vehicles and are exemplified by the teachings set forth, for example, in U.S. Pat. Nos. 4,016,322, 4,063,684 and 4,131,708 issued Apr. 5, 1977, Dec. 20, 1977 and Dec. 26, 1978 respectively.

As is well known, the construction characteristics of carbon-carbon materials influence the boundary layer transition progression on the nose-tip of reentry vehicles through the intrinsic surface roughness features that develop during ablation of the nose-tip during its re-entry into the earth's atmosphere. Subsequent to the onset of nose-tip boundary layer transition, these tips change shape from a blunt laminar configuration to a geometrically sharp turbulent configuration through a continuing ablative shaping process. Variabilities in transition onset altitudes and forward progression may occur as caused by variations in material properties that govern the material surface roughness. Such variations may also involve non-uniformities on the same tip which produce nosetip asymmetries. Such events influence vehicle performance since nosetip shaping asymmetries produce vehicle trims which affect the vehicle motion. A representative shape change sequence is depicted in FIG. 1 where viewing the shapes from left to right portrays the ablative responses during the reentry regime of a typical nose cone. A computed asymmetric shaping sequence is depicted in FIG. 2 in which case the asymmetry is caused to develop by an assumed non-uniformity in the nosetip's intrinsic roughness.

A number of technical advances have been made in the area of nose-cone technology, notably, as noted above, in the use of carbon-carbon composites as structural materials in their fabrication. However, in spite of these advances, variations in material surface roughness ultimately produce nose tip assymetries that, in turn, effect the flight characteristics of the re-entry vehicle. However, with the present invention, a technique has been developed that unexpectedly overcomes these anomalies by using a carbon-carbon nose cone implant in the leading surface of the tip of the nose cone. The carbon-carbon material implanted in the nose tip is characterized by having a usually greater density and a greater roughness than the carbon-carbon material forming the main portion of the nose cone. As a consequence, it has been found that when the implantation material is exposed to the boundary layer, its difference in surface roughness and density from that of the material of the nose cone itself, will uniformly trip the nose-tip boundary layer causing the transition forward progression, and hence the sharpening of the nose cone to proceed symmetrically rather than asymmetrically as occurred heretofore.

SUMMARY OF THE INVENTION

In accordance with this invention, it has been found that the insertion into the leading surface of a re-entry vehicle's nose cone of a carbon-carbon material of usually greater density and greater roughness than that which characterizes the carbon-carbon material of the main portion of the nose cone will overcome the undersirable nose tip asymmetries which occured heretofore to the nose cones of re-entry vehicles during their re-entry into the earth's atmosphere. Exposure of the implanted material to the boundary layers will uniformally trip the nosetip boundary layer causing the sharpening of the nose cone during re-entry to proceed symmetrically. This avoids the undesirable effects on the flight characteristics of the re-entry vehicles that were encountered heretofore during re-entry.

Accordingly, the primary object of this invention is to provide an improved technique for controlling the ablative symmetry of a re-entry vehicle nose cone during its re-entry regime.

Another object of this invention is to provide an ablative system for re-entry vehicles that eliminates the undesirable asymmetrical variations in nose cone geometry that have occurred heretofore during the re-entry of such vehicles into the earth's surface atmosphere.

Still another object of this invention is to provide a reentry vehicle nose cone with a nose tip implant of a carbon-carbon material characterized by having a usually greater density and higher degree of roughness than that which characterizes the material which makes up the main portion of the nose cone.

The above and still other objects and advantages of the present invention will become more readily apparent upon consideration of the following detailed disclosure thereof when taken in conjunction with the accompanying drawings.

BRIEF DESCRIPTION OF THE DRAWINGS

In the drawings:

FIGS. 1 and 2 are plots which represent the erosion profile or shape change sequence produced by a re-entry vehicle nose cone during its re-entry regime;

FIG. 5 is a schematic illustration showing various configurations of the rearward face of the nose tip implant of this invention.

DESCRIPTION OF THE PREFERRED EMBODIMENT

The re-entry vehicle heat protection technical community is providing improved nosetip material concepts in terms of higher performance and lower recession. These new and improved materials are usually carbonaceous and they are typically of woven construction. Since both the woven part and the binding matrix in their fully processed state are generically carbon (or graphite), the resulting products have been identified by the name of carbon-carbon.

Carbon-carbon is a well known class of high performance, low recession nose tip material that typically undergoes transition from a blunt laminar shape to a sharp turbulent shape at about 30,000 feet altitude for a nominal reentry angle. However, the construction characteristics of carbon-carbon materials influence the boundary layer transition progression on the nose-tip through the intrinsic surface roughness features that develop during ablation. Subsequent to the onset of nose-tip boundary layer transition, these tips change shape from a blunt laminar configuration to a geometrically sharp turbulent configuration through a continuing ablative shaping process. Variabilities in transition onset altitudes and forward progression may vary by ±5000 feet because of the variations in material properties that govern the material surface roughness. Such variations also involve non-uniformities on the same tip thus producing nose-tip asymmetries. Such events influence vehicle performance since nose-tip shaping asymmetries produce vehicle trims which effect the vehicle's motion and produce variations in flight performance. A representrative shape change sequence is depicted by the plot in FIG. 1 where viewing the shapes from left to right portrays the ablative response during re-entry for the nominal re-entry angle. A computed asymmetric shaping sequence is depicted in FIG. 2 in which case the asymmetry is caused to develop by an assumed non-uniformity in the nose-tip's intrinsic roughness, thus producing undesirable variations in flight performance during the vehicle's re-entry regime.

Figure 4:
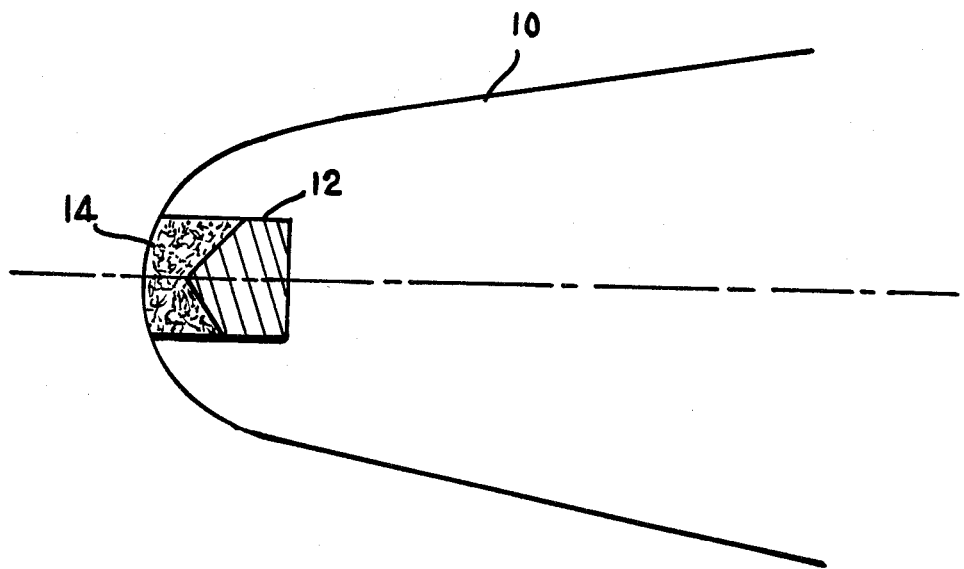
FIG. 4 is a schematic illustration, partially in cross-section, of the nose cone implant of this invention.

In spite of advances in the development of ablative materials, such as the carbon-carbon materials referred to above, variations in material surface roughness untimately produce undesirable nose-tip asymmetries that, in turn, produce undesirable flight characteristics during re-entry. However, a technique to avoid this problem has been developed by the present invention. It comprises an implantation into the leading surface or nose-tip of a nose cone of a carbon-carbon material of a usually greater density and greater surface roughness than that exhibited by the ablative material which comprises the principal portion of the nose cone. Exposure of the implant material to the boundary layer uniformly trips the nosetip boundary layer thereby causing the transition forward progression, and hence the sharpening of the nose cone to proceed symmetrically during its re-entry regime. As stated heretofore, it has been found that if a material rougher than the main body is implanted into the nose tip of a nose cone, its exposure will uniformly trip the nose tip boundary layer causing the sharpening to proceed symmetrically. The position of the implant is shown in FIG. 4 which depicts a nose cone 10 of a suitable ablative material, such as carbon-carbon, the implant material 12 of this invention and a nose cap 14. The implantation of the implant 12 can be performed either by a weaving process or by machining. Machining is identified because it provides close dimensional control. It should be done prior to the final densification cycle during the fabrication of the carbon-carbon material so that a structurally integral piece is produced.

The carbon-carbon billets from which re-entry vehicle nose-tips are fabricated are initially woven by one of a variety of weaving techniques into an item called a preform. This preform is subsequently processed by successive densification steps into the resultant finished product. The densification process is controlled by MIL Spec P 87 119, "Carbon-Carbon Preform Densification" which specification fully and in detail describes all aspects of the applicable and pertinent steps.

Figure 3:
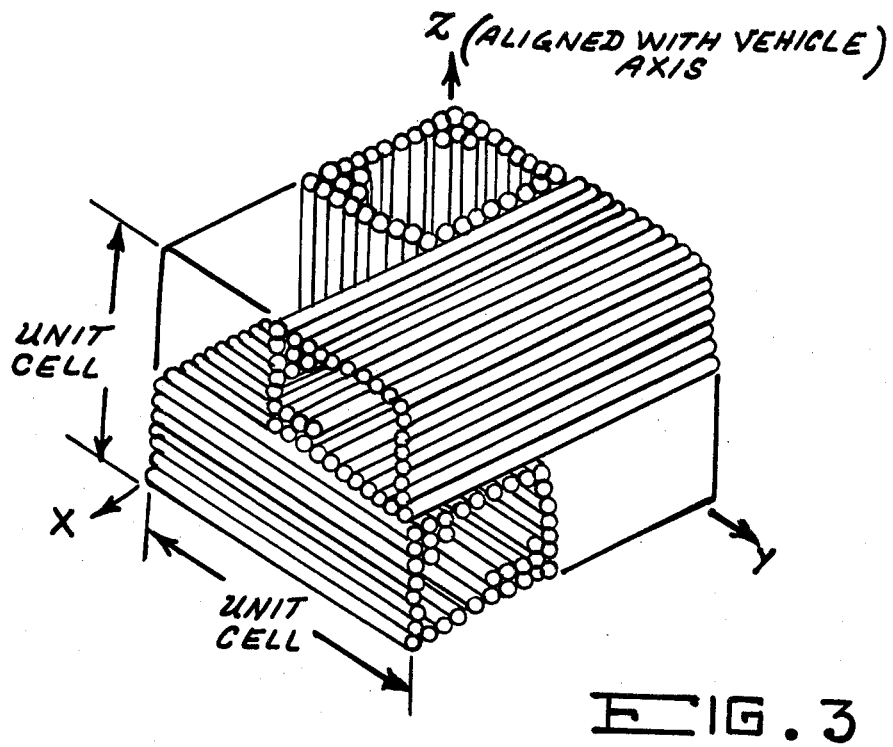
FIG. 3 is an isometric view of a woven carbon-carbon material found useful for this invention.

Orthogonally woven carbon-carbon materials, which are suitable for the present invention, are depicted in FIG. 3 to a scale which allows the presentation of a single unit-cell. The Z-direction is typically assigned to be the same as the axial direction of the nose-tip or the re-entry body. The X and Y directions are normal to the axis, i.e., they are sometimes referred to as the transverse directions. In FIG. 3, individual filaments are depicted as making up each fiber bundle although no specific filament count is intended to be shown. A fiber bundle may be composed of more than one (1) yarn. Orthogonally woven constructions are identified as to that total proportional filament content in the three principal directions with the axial (Z) content being given last. Examples of filament proportions that have been woven in the past are 2-2-6, 2-2-3, and 2-2-1. Thus, for a 2-2-3 carbon-carbon, the total filament contents in the X, Y, and Z directions are in the same proportion as 2 to 2 to 3. Past experience has shown that the intrinsic roughness can be modified by the proportion of the filament content. (The intrinsic roughness may be modified by other factors also.) There are other construction types such as N-dimensional, pierced fabric, various windings, etc. The following descriptions are definitized to orthogonal weaves, but the concept applies to any other weave to which the appropriate dimensional placement of an implant can be controlled.

As was stated heretofore, the present invention comprises an implantation into the main nose-tip of a material rougher than the material of main tip such that its exposure will uniformly trip the nose-tip boundary layer causing the turbulent flow to sharpen the nose tip symmetrically. The implantation can be performed by a weaving process or by a machining process. The machining process is easier to visualize, but it does interrupt the fiber bundle continuity, thereby weakening the tip somewhat in a non-critical forward location. The machining approach is described here primarily for ease of conceptual demonstration. The machining occurs prior to the final densification cycle during fabrication of the carbon-carbon material so as to result in a structurally integral piece. The densification can then be continued in the usual manner with the total number of steps and cycles conforming to the already cited process specification. One should visualize a nosetip of a primary carbon-carbon material as depicted in FIG. 4. A cylindrical hole is machined from the front end of the nose cone 10 and an implanted boundary layer trip material 12 of greater roughness than the main nose-tip material is implanted. The material 12 is then capped by a material 14 which is smoother than the main material or, alternatively, of the same roughness character. The implant 12 into the nose cone 10 can be a material such as the 2-2-1 or 2-2-6 orthogonal weave. The nose cone 10 and the capping material 14 can be a 2-2-3 orthogonal weave referred to heretofore. To insure an optimum transition behavior, the radial dimension of the implant should be a minimum of five (5) unit cell lengths but not greater than a third ($\frac{1}{3}$) of the tip radius. The capping material 14 can be a smooth, fine weave pierced fabric. The axial length of the rougher implant should be sufficiently long such that a fully turbulent shape develops in the presence of this material. The axial length of the smoother cap should be sized to assure that the exposure of the implant occurs at a greater altitude than the natural transition altitude of the capping material. The forward surface of the implant is generated to be conical or ogival for the purpose of insuring that the initial implant exposure is along the tip axis even when slight laminar shape asymmetries may have developed.

As shown in FIG. 4, the implant is at the tip of the cone. The nose transition from blunt to sharp is delayed by using very smooth material such as 2-2-3 carbon-carbon as the cap 14. This can be the same material as in the main body except that it would have one extra densification cycle. The material 12 immediately behind 14 would normally transition from blunt to sharp at about 5,000 to 10,000 feet above altitude when it is first uncovered. At this time, it immediately provides full turbulence near the stagnation point. This second material 12 (2-2-6 carbon-carbon), when completely ablated, allows the main part of the nose tip to maintain full turbulence at the stagnation point because of the higher Reynolds Numbers existing at this point in the re-entry trajectory. The desired boundary layer tripping results can be achieved by implantation of the 2-2-6 carbon-carbon or certain 2-2-3 or 2-2-1 carbon-carbons which already have displayed early transition characteristics with respect to conventional 2-2-3 carbon-carbon material. The very smooth outer material 14 covers the trip material 12 so as to delay the trip altitude to a pre-determined value. A more suitable implantation technique, however, is provided via the weaving process and chemically coating the filament/fiber bundles in the "implant zone" in the Z direction or the Z and Y directions or in all three directions. Coating can be any one of several conventional refractories specially selected for the specific application. An element or compound is applied and the refractory formed in the conventional manner by the application of the correct heat cycle and environment. Thermodynamic principles suggest which conventional refractories are best for specific applications. The refractory coating is chosen on the basis of lower ablation temperature and lower heat of ablation than the coated carbonaceous filaments. There will thus be a preferential chemical reaction surrounding the filaments thereby producing an effective roughness enhancement.

Depending on the application and the need to better control the symmetry of the transition forward progression, a variety of implantation geometric patterns can be attained. For example, the weave implantation into fine weave pierced fabric might consist of a series of concentric rings of Z fiber bundles. In a further step of elaboration and refinement in purpose, these rings can be graded in thermal performance by ther use of different refractory coatings, hence, the effective roughness; thereby achieving a radially varying roughness controlling transition. The rearward surface of the implantation may be geometrically modified in the sense of being (A) flat, (B) boat-tailed, or (C) recessed as depicted in FIG. 5, for the purpose of adjusting and matching shaping sequences between clear air and weather. Further refinements are possible in grading the thermal performance in the Z direction by varying the refractory coatings.

In the foregoing description, the technique of this invention and its rationale for incorporating a roughness modification into the main nose-tip billet of a re-entry vehicle was disclosed. It has also been found that the roughness modification is physically compatible with other nose-tip modifications such as the "soft core", which locally enhances ablation, or the "erosion hard inner core" modification. In combination with the "soft core", the present technique becomes an unexpected extension for providing graded performance characterization in bridging from roughness modification to ablation modification with an element of each still being present in the other concept. Therefore, it is believed that the present invention, with its transition roughness implantation approach, leaves the door open for other refinements in the future as may be needed, thus adding to the desirability and importance of the present invention.

What is claimed is:

1. A re-entry nose cone comprising a first and a second element; said first element being composed of a first carbon-carbon composite ablative material having a recess in the forwardmost portion; and said second element including a pair of components, one of the components of said pair of components being in the form of an implant positioned in said recess and being composed of a second carbon-carbon composite ablative material characterized by having a different density than that charactrerized by said first ablative material, and a surface roughness greater than that of said first ablative material, the other component of said pair of components forming a forward cap section for said implant and being composed of a third carbon-carbon composite ablative material characterized by having a density and surface roughness similar to that characterized by said first ablative material; whereby said nose cone exhibits a symmetrical erosion profile during its re-entry regime.

2. A re-entry vehicle nose cone in accordance with claim 1 wherein said first, second and third ablative materials are composed of a multiplicitdy of reinforcing carbon fibers orthogonally woven and embedded within a carbon matrix.

3. A re-entry nose cone in accordance with claim 1 wherein said density of said second ablative material is higher than that of said first ablative material.

4. A method of controlling the ablation symmetry of a re-entry vehicle nose cone during its re-entry regime which comprises the steps of (A) providing a nose cone composed of a first carbon-carbon composite ablative material; (B) machining a recessed portion of predetermined configuration into the leading surface of said nose cone; (C) implanting a second carbon-carbon composite material into said recessed portion, said second ablative material characterized by having a different density, and greater surface roughness, than that characterizing said first ablative material, and (D) forming a forward cap section over said implant said cap section composed of a third carbon-carbon composite material characterized by having a density and surface roughness similar to that characterized by said first ablative material such that when said implanted second ablative material is exposed to a re-entry environment, its difference in surface roughness will uniformily trip the nose cone boundary layer thereby allowing the transition forward progression of said nose cone to proceed symmetrically and exhibit a symmetrical erosion profile during its re-entry regime.

5. A method in accordance with claim 4 wherein said carbon-carbon material comprises a multiplicity of carbon reinforcing fibers orthoganally woven and embedded within a carbon matrix.

6. A method in accordance with claim 4 wherein said second ablative material is characterized by having a density that is higher than that characterizing said first ablative material.

* * * * *